Dec. 5, 1961 G. J. H. SAUSELE 3,011,421

PHOTO-TYPOGRAPHIC MASTER CHARACTER PLATE

Filed March 10, 1959

INVENTOR

George J. H. Sausele

BY Watson, Cole, Grindle & Watson

ATTORNEYS

United States Patent Office 3,011,421
Patented Dec. 5, 1961

3,011,421
PHOTO-TYPOGRAPHIC MASTER CHARACTER PLATE

George J. H. Sausele, New Providence, N.J., assignor, by mesne assignments, to American Type Founders Co., Inc., a corporation of Delaware Filed Mar. 10, 1959, Ser. No. 798,511
14 Claims. (Cl. 95—85)

This invention relates in general to the art of phototypesetting, and more particularly has to do with the master plates which bear the fonts of characters from which selection may be made in the production of photocomposition for printing.

The general object of the invention is to provide novel and improved means and methods for the accurate and precise mounting of the master plate or character disc to insure accurate and precise selection and positioning of the disc for perfect alignment and spacing of the characters in the resulting photocomposition.

An example of the type of character disc to which the present invention relates is disclosed in my copending application Serial No. 686,233, filed September 25, 1957.

More specifically, the invention contemplates the provision of a reinforcing hub for the annular master plate or disc, which provides the inner bearing edge surface by which the disc is accurately centered upon the phototypesetter.

Other novel improvements relate to the method of attaining the accurate centering of the disc and hub, and to the attachment of the stop pins and electrical contacts carried by the disc and associated with the operation of the typesetter to which reference has already been made.

The invention, in its preferred embodiments, contemplates the provision of a disc constructed basically of transparent plastic material with a plurality of type fronts dyed thereon, and mounted upon a hub member made of a material having substantially the same coefficient of thermal expansion as its mating part, the rotatable disc supporting shaft assembly of the photo-composing machine. The disc is preferably reinforced by an annular ring of similar plastic material to stiffen the disc somewhat to minimize flutter by rapidly damping out any vibration which might be caused by the sudden stopping of the rotation of the disc during the selection of characters.

Other objects and features of novelty will be apparent from the following specification when read in connection with the accompanying drawings in which one embodiment of the invention is illustrated by way of example.

Figure 1:
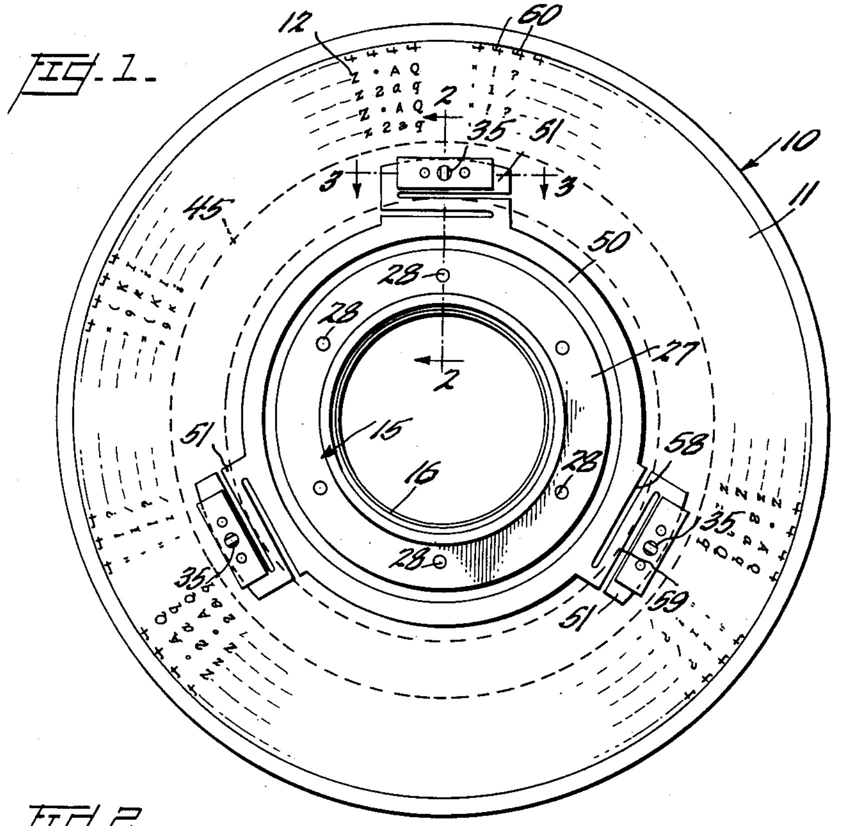
FIGURE 1 is a plan view of the active face of a character disc embodying the principles of the invention.

For a complete exposition of the general nature of the master character disc which is the subject of the present application, reference is made to FIGURES 10–14 and 23 of my copending application Ser. No. 686,233, and the appropriate descriptive matter in the specification of that application.

Briefly considered, the disc is of transparent material basically, but with multiple alphabets or fonts of characters imprinted upon the outer peripheral areas thereof, the characters being delineated in transparent portions of the disc with the immediately surrounding backgrounds opaque. In line with the needful and highly successful representation of these characters in precise outline and detail, the discs are not only imprinted or dyed in a novel and effective manner, but the adjustment of the disc and mounting is accomplished in a way intended to preserve and enhance such precision and accuracy.

In the drawings, the novel disc assembly is designated by the general reference character 10 and the disc proper, designated 11 carries, in this case, three exactly duplicated sequential font areas 12, each of a little less than 120° in arcuate extent.

The disc is mounted upon an annular hub member 15, the internal marginal portion 16 of which is formed in a precise circular configuration for an accurate running fit on the rotatable shaft assembly of the photo-typesetting machine. The concentricity of the plate assembly must be precisely established and maintained true; the hub therefore must not be subject to wear.

Figure 2:
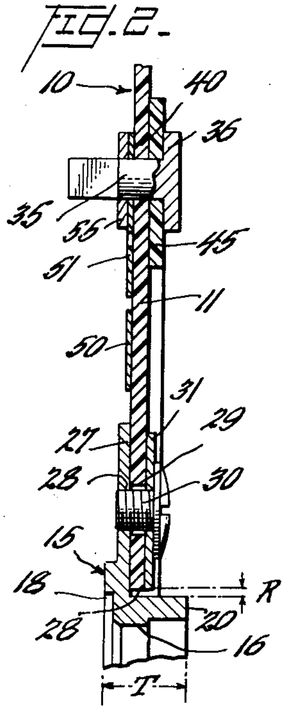
FIGURE 2 is a fragmentary view on an enlarged scale and in radial cross-section as taken on line 2—2 of FIGURE 1.

The hub 15 is also formed with a slightly protuberant annular rib or boss 18 upon one side and an axially annular extending flange 20 upon the other side, the distance between the face of the portions 18 and 20 being indicated at T in FIGURE 2 of the drawings and this comprising the effective width of the master disc structure which is frictionally gripped by the resilient or yieldable clamping devices associated with the shaft of the photo-typesetting machine. Thus, as fully described in my copending application referred to above, the disc is urged continuously in one direction of rotation but is adapted to be stopped in a fixed position for the photographing of a selected character, whenever the selectable stop elements of the machine are interposed in the path of one or the other of the stop pins on the master disc which will be described presently.

The plastic disc element 11 is provided with an internal opening, the margin 25 of which is of a somewhat greater diameter than the external margin of the flange 20 of the hub, this difference in diameter or radius being indicated at R in FIGURE 2.

The hub 15 has a radially extending annular flange 27 in which threaded openings 28 are formed. The disc element 11 itself is formed with corresponding openings of a very slightly greater diameter as indicated at 29. As an example of this differentiation of sizes of the openings, the threaded opening 28 may be made by a No. 43 drill, while the opening 29 in the plastic plate 11 may be made by a No. 30 drill.

Screw elements 30 are first passed through a washer 31 and thence through the opening 29 in the plastic plate and threaded through the opening 28 in the hub flange 27. Initially, the screws 30 are tightened to only a slight extent to frictionally hold the disc 11 against the flange 27 of the hub for a purpose which will be explained later.

Figure 4:
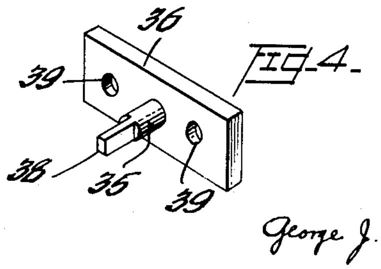
FIGURE 4 is a view in perspective of one of the stop pins applied to the disc and a base plate from which it projects.

For the purpose of stopping the disc at the nearest characters selected by the stop elements of the photo-typesetting machine, three stop pins 35 are employed, these pins being secured to the disc element 11 at points 120° apart and approximately half way of the radial width of the annular disc. Naturally, there will be as many pins as there are fonts 12 on the disc. The pins 35 are either fixed to or integrally formed with the rectangular base plates 36 as most clearly shown in FIGURE 4 of the drawings. Preferably the pins are flattened on one or both of their lateral sides, at least upon the approach side which is contacted by the stop elements of the machine. This flattening is clearly indicated at 38 in FIGURE 4.

Openings 39 are formed in the base plate 36, and after the pins 35 have been inserted in the drilled openings 40 of the disc, rivets or other appropriate fastening elements 42 are passed through the openings 39 for securing the pins firmly and accurately to the disc plates 11.

For the purpose of strengthening and somewhat rigidifying the plastic disc element 11 an annular flat plastic ring 45 is cemented to the disc element 11 at approximately the same radial distance from the center of the assembly as the pins 35.

Figure 3:
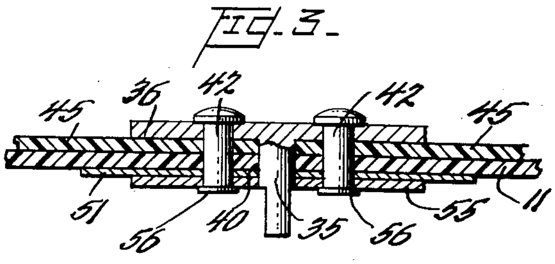
FIGURE 3 is a fragmentary sectional view taken on line 3—3 of FIGURE 1.

For the purpose of transmitting certain electrical impulses involved in the operation of the machine, certain conductors are embodied in the disc arrangement. These conductors include a thin annular conductor element 50 which is preferably cemented or bonded to the plastic disc just outwardly of the outer edge of the hub flange 27. This ring 50 has substantially S-shaped radial extensions 51 distributed around its periphery at intervals of 120°, i.e. one for each stop pin. These extensions 51 are adapted to be clamped in position along with the stop pin assemblies 35 as will be clearly understood from an inspection of FIGURE 3 of the drawings.

The several layers through which the clamping rivets 42 must extend may be accounted for by an inspection of this figure, the rivets first passing through the base plate 36 of the pin 35, then through the annular reinforcing ring 45, then through the disc element 11 itself, then through the outer portion of the conductor extension 51, and finally through a thin metal retaining plate 55, whereupon the rivets are headed over as at 56.

The S-shaped conductor extensions 51, being slotted as at 58 and 59, provide a certain amount of flexibility between the body portion of the conductor annulus 50 and the fastenings of the stop pins 35, so that any minor adjustments of the positions of the extensions 51 may take place without distorting the annulus 50.

As a matter of interest in connection with the utility of the novel article of manufacture herein described, it may be stated that the annulus 50 is adapted to be contacted by a brush in the photo-typesetting machine and the circuit through the disc assembly is completed by the extensions 51 and the stop pins 35 to the stop elements of the machine which are selectively interposed in the path of the pins.

The procedure for adjusting the disc for use in the photo-typesetter machine will now be described.

The relatively loose frictional attachment of the plastic plate or disc element 11 to the hub 15 has already been adverted to and when this has been accomplished, the disc assembly is then placed upon the rotatable shaft of one of the photo-typesetting machines itself or of a suitable adjusting jig. Markings 60 consisting of intersecting radial and circumferential lines are placed around the outer periphery of the disc and spaced apart the same distance as the radial rows of characters in the fonts 12. By rotating the disc and observing these markings through an appropriate optical instrument, for example a microscope with a calibrated reticle, any undulation of the markings will indicate that the disc is off-center. Then by noting the outward nodes of the undulations, the disc may be tapped slightly until it is shifted to an extent necessary to compensate for the detected undulations and this procedure is repeated until the line of markers 60 is perfectly concentric with the bore 16 of the hub 15. Then when the disc is perfectly centered, the screws 30 are tightened and preferably all of the exposed portions of the screws 30 and washers 31, and adjacent portions of the disc and hub, may be coated with a sealing material such as a lacquer composition. An example of a suitable sealing coating which may be used is one of the alkyd resin compositions marketed under the trademark Glyptal owned by General Electric Company.

The master discs or plates as thus manufactured and assembled, each bears fonts of printing characters according to desired type sizes and face designs, and any number of discs bearing appropriate fonts may be kept in stock and selected for use in the typesetting machine for the particular job at hand.

It is understood that various changes and modifications may be made in the embodiment illustrated and described herein without departing from the scope of the invention as defined by the following claims.

Having thus described the invention, what is claimed as new and desired to be secured by Letters Patent is:

1. A master character plate for photo-typesetting machines or the like comprising a flat disc of transparent material bearing at least one font of printing characters, the characters being disposed in accurate alignment upon the disc, means for axially mounting the disc as upon a rotatable member of such machine, said means comprising a hub member having an axial bore adapted to rotatably receive said rotatable member, and means for securing said disc to said hub member in accurate concentric relationship, said hub being made of a material having a coefficient of thermal expansion substantially the same as that of said rotatable member.

2. The master character plate as set forth in claim 1 in which the disc is of vinyl resin, being a copolymer of vinyl chloride and vinyl acetate, and the hub is of cast iron.

3. A master character plate for photo-typesetting machines or the like comprising a flat disc of transparent material bearing at least one font of printing characters, the characters being disposed in accurate alignment upon the disc, means for axially mounting the disc as upon a rotatable member of such machine, said means comprising a hub member having an axial bore adapted to rotatably receive said rotatable member, and means for securing said disc to said hub member in accurate concentric relationship, said disc having a central opening therethrough which is of a greater diameter than the diameter of said axial bore in the hub member, means for preliminarily attaching said disc to the hub member for universal adjustment in its plane, and means for permanently securing said attaching means after the accurately centered position of the disc is established, the hub member being provided with a radial flange against which the disc is adapted to be secured and index markings disposed on the disc for determining the proper radial and circumferential adjusted positions of the disc.

4. A master character plate for photo-typesetting machines or the like comprising a flat disc of transparent material bearing at least one font of printing characters, the characters being disposed in accurate alignment upon the disc, means for axially mounting the disc as upon a rotatable member of such machine, said means comprising a hub member having an axial bore adapted to rotatably receive said rotatable member, and means for securing said disc to said hub member in accurate concentric relationship, said disc having a central opening therethrough which is of a greater diameter than the diameter of said axial bore in the hub member, means for preliminarily attaching said disc to the hub member for universal adjustment in its plane, and for permanently securing said attaching means after the accurately centered position of the disc is established; said attaching and securing means comprising headed screw fastening elements threaded into openings in said hub but passing loosely through slightly oversize openings in the disc, whereby partial screwing of the fastening elements establishes the preliminary frictional attachment and after accurate centering the permanent securing may be accomplished by screwing the fastening elements home with the inner side of the heads serving to clamp the disc firmly; a sealing coating which is adherent to both plastic and metal being applied to the exposed portions of the fastenings when finally secured.

5. The master character plate as set forth in claim 4 in which the coating is Glyptal.

6. A master character plate for photo-typesetting machines or the like comprising a flat disc of transparent material bearing at least one font of printing characters, the characters being disposed in accurate alignment upon the disc, means for axially mounting the disc as upon a rotatable member of such machine, said means comprising a hub member having an axial bore adapted to rotatably receive said rotatable member, and means for securing said disc to said hub member in accurate concentric relationship, and as many stop pins projecting from one face of said disc perpendicular to the plane thereof as there are fonts of characters represented thereon, each of said stop pins positioned in circumferential spatial relationship respectively to one of said fonts.

7. The master character plate as set forth in claim 6 in which said hub member is provided with axial annular flanges adapted to be frictionally clamped in an axial direction for driving the disc, the over-all axial length of such flanged portion of the disc being greater than the axial thickness of the other portions of the hub, the disc, and the securing means.

8. The master character plate as set forth in claim 7 in which the stop pins, adapted to be abutted by manipulatable stop devices forming a part of the operative machine to which the disc is applied, have at least the approach sides of the stop pins flattened in a plane perpendicular and radial with respect to the plane of the disc.

9. The master character plate as set forth in claim 6 in which said stop pins are provided with a flat base plate and project through openings in the disc, the base plate lying flat against the rear face of the disc, and fastening elements passing through the base plate and the disc and serving to secure the pins rigidly in position.

10. The master character plate as set forth in claim 9 in which the disc is of plastic material, and a flat annulus of similar plastic material is cemented to one face of the disc radially outwardly from the hub member, to lend rigidity to the plate assembly to minimize vibration, and in which the pins also project through said annulus.

11. The master character plate as set forth in claim 6 in which a conductor ring member is secured to one face of the disc radially outwardly of the hub member as for electrical contact by a brush, and means are provided for maintaining electrical connection between the ring member and all of the stop pins.

12. The master character plate as set forth in claim 11 in which the conductor ring member is provided with radial extensions which are clamped in electrical contact with the base plates of the pins.

13. The master character plate as set forth in claim 12 in which the radial extensions of the ring member are formed in a sinuous zig-zag configuration to accommodate the electrical conductor parts to any dimensional deviation with respect to the disc.

14. A master character plate for photo-typesetting machines or the like comprising a flat disc of transparent material bearing at least one font of printing characters, the characters being disposed in accurate alignment upon the disc, means for axially mounting the disc as upon a rotatable member of such machine, said means comprising a hub member having an axial bore adapted to rotatably receive said rotatable member, and means for securing said disc to said hub member in accurate concentric relationship, said disc being made of plastic material, and a flat annulus of similar plastic material cemented to one face of the disc radially outwardly from the hub member to lend rigidity to the plate assembly to minimize vibrations.

References Cited in the file of this patent

UNITED STATES PATENTS

| | | |
|---|---|---|
| 2,715,862 | Moyroud | Aug. 23, 1955 |
| 2,742,830 | Wirtz | Apr. 24, 1956 |
| 2,791,162 | Snyder | May 7, 1957 |